(12) United States Patent
Dinerman et al.

(10) Patent No.: US 9,108,606 B2
(45) Date of Patent: Aug. 18, 2015

(54) FLUIDICALLY CONTROLLED PRESSURE SWITCHING VALVE FOR A VEHICLE BRAKE SYSTEM AND VEHICLE BRAKE SYSTEM

(71) Applicant: Robert Bosch GmbH, Stuttgart (DE)

(72) Inventors: Michael Dinerman, Heilbronn (DE); Andrej Gardt, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 13/941,773

(22) Filed: Jul. 15, 2013

(65) Prior Publication Data

US 2014/0021777 A1 Jan. 23, 2014

(30) Foreign Application Priority Data

Jul. 18, 2012 (DE) .......................... 10 2012 212 546

(51) Int. Cl.
*B60T 13/16* (2006.01)
*B60T 15/36* (2006.01)

(52) U.S. Cl.
CPC ............... *B60T 15/36* (2013.01); *B60T 13/161* (2013.01)

(58) Field of Classification Search
CPC ....... B60T 8/445; B60T 8/4275; B60T 8/441; B60T 8/4881; B60T 8/348; B60T 13/161; B60T 15/36

USPC .................... 303/10, 11, 113.2, 116.1, 119.1; 137/505.18, 505.39, 505.41, 505.42
See application file for complete search history.

(56) References Cited

U.S. PATENT DOCUMENTS

| | | | | |
|---|---|---|---|---|
| 5,921,638 | A * | 7/1999 | Higashimura et al. ...... | 303/116.1 |
| 6,386,646 | B1 * | 5/2002 | Hinz et al. ..................... | 303/11 |
| 8,342,617 | B2 * | 1/2013 | Oosawa ........................ | 303/116.1 |
| 2011/0109152 | A1 * | 5/2011 | Schepp et al. ................. | 303/11 |

FOREIGN PATENT DOCUMENTS

| | | | |
|---|---|---|---|
| DE | 4202388 A1 * | 8/1993 | |
| DE | 10 2009 027 706 A1 | 1/2011 | |

\* cited by examiner

*Primary Examiner* — Pamela Rodriguez
(74) *Attorney, Agent, or Firm* — Maginot, Moore & Beck LLP

(57) ABSTRACT

The disclosure relates to a fluidically controlled pressure switching valve for a vehicle brake system including a valve chamber, which is arranged in a valve interior and into which an inlet opening and an outlet opening open, and a valve closing body, which is movable in the valve interior and which comprises a piston, defining a first piston surface and a second piston surface, and including a closing element. The valve closing body is movable in accordance with a pressure difference between a pressure acting on the first piston surface and a pressure acting on the second piston surface, against the force of a setting spring arranged in the valve interior, between a closed position, in which a fluid connection between the inlet opening and the outlet opening is interrupted, and an open position, in which the fluid connection between the inlet opening and the outlet opening is open.

9 Claims, 4 Drawing Sheets

FLUIDICALLY CONTROLLED PRESSURE SWITCHING VALVE FOR A VEHICLE BRAKE SYSTEM AND VEHICLE BRAKE SYSTEM

This application claims priority under 35 U.S.C. §119 to patent application no. DE 10 2012 212 546.9, filed on Jul. 18, 2012 in Germany, the disclosure of which is incorporated herein by reference in its entirety.

BACKGROUND

The present disclosure relates to a fluidically controlled pressure switching valve for a vehicle brake system and to a corresponding vehicle brake system having a pressure switching valve of the kind described herein.

The prior art includes vehicle brake systems with vehicle dynamics control, e.g. ABS/TCS/ESP. A vehicle brake system as a technical system is used to ensure deceleration and prevention of rolling movements of a motor vehicle according to the requirements of the driver or according to the driving situation. Integrated vehicle dynamics control counteracts possible breakaway of the car by selective braking of individual wheels. From the sector of vehicle brake systems, a very wide variety of systems is known in which an active or partially active pressure buildup in the hydraulic unit is achieved by means of a two-stage high-pressure switching valve. When activated or actuated, the high-pressure switching valve opens a suction path from a brake master cylinder to a return pump. In general, the high-pressure switching valve is operated by means of a magnetic field produced by an electric coil.

German Offenlegungsschrift DE 10 2009 027 706 A1 has disclosed a fluidically controlled control valve for a vehicle brake system and a corresponding vehicle brake system. The control valve described comprises a valve chamber, which is arranged in a valve interior and into which an inlet opening and an outlet opening open, and a valve closing body, which is guided movably in the valve interior and which comprises a piston, having a first piston surface and a second piston surface, and a closing element, wherein the valve closing body can be moved in accordance with a pressure difference between a pressure acting on the first piston surface and a pressure acting on the second piston surface, against the force of a setting spring arranged in the valve interior, between a closed position, in which a fluid connection between the inlet opening and the outlet opening is interrupted, and an open position, in which the fluid connection between the inlet opening and the outlet opening is open, wherein the first piston surface delimits a first control chamber in the valve interior, which chamber is connected by at least one compensating connection to the outlet opening, wherein the second piston surface delimits a second control chamber, which chamber is connected by a pressure-relieved connection to the atmosphere, and wherein the second control chamber is separated from the valve chamber by a partition wall. Owing to the pressure-relieved connection to the atmosphere or the ambient pressure, external leakage, i.e. leakage to the outside, can occur.

SUMMARY

The fluidically controlled pressure switching valve according to the disclosure for a vehicle brake system, having the features described herein, has the advantage that it is possible to simplify or boost the capability of the vehicle brake system or of a vehicle dynamics control system while at least maintaining the same system functions and to save on components and development costs.

At the heart of the disclosure is the fluidic operation of a fluidically operated pressure switching valve by means of a system pressure, which is produced at the output of a return pump, for example. The fluidically controlled pressure switching valve according to the disclosure is preferably used as a hydraulically controlled pressure switching valve in a hydraulic vehicle brake system with appropriate hydraulic interconnections. Through the use, according to the disclosure, of the system pressure for operating the pressure switching valve, no connection to the ambient pressure or the atmosphere is required and external leakage can advantageously be avoided or eliminated. Moreover, it is possible to dispense with an actuating element known from the prior art, which is embodied as an electric magnet assembly. Thus, the advantage of the disclosure consists in that the pressure switching valve is operated hydraulically, without using electric coils and software algorithms in the control unit. Owing to the use of system pressure and the resulting generation of significantly higher actuating forces in the pressure switching valve, a single-stage embodiment of the pressure switching valve is advantageously made possible.

Embodiments of the present disclosure make available a fluidically controlled pressure switching valve for a vehicle brake system having a valve chamber, which is arranged in a valve interior and into which an inlet opening and an outlet opening open, and having a valve closing body, which is guided movably in the valve interior and which comprises a piston having a first piston surface and a second piston surface and a closing element. In this arrangement, the valve closing body can be moved in accordance with a pressure difference between a pressure acting on the first piston surface and a pressure acting on the second piston surface, against the force of a setting spring arranged in the valve interior, between a closed position, in which a fluid connection between the inlet opening and the outlet opening is interrupted, and an open position, in which the fluid connection between the inlet opening and the outlet opening is open.

Moreover, the first piston surface delimits a first control chamber in the valve interior, which chamber is connected by at least one compensating connection to the outlet opening, and the second piston surface delimits a second control chamber, which is separated from the valve chamber by a partition wall. According to the disclosure the second control chamber is connected to a system pressure by a control port.

Moreover, a vehicle brake system having a brake master cylinder, a fluid control unit and at least one wheel brake is proposed. For brake pressure modulation of the at least one wheel brake in at least one brake circuit, the fluid control unit comprises in each case a changeover valve, a return pump and a pressure switching valve embodied according to the disclosure, which is in each case fitted in in a suction line between the corresponding return pump and the brake master cylinder.

The abovementioned advantages are associated with a further economic advantage, such as a cost saving through a simpler design embodiment. Moreover, possible internal leakages between the primary and secondary circuit, i.e. between a brake master cylinder and the return pump, uncritical by virtue of the pressure switching valve according to the disclosure, owing to the connection with the suction side of the pump. The leakage volumes can be sucked in by the return pump and pumped back to the discharge side.

It is particularly advantageous that the piston separates the first control chamber from the second control chamber and can be sealed off with respect to a valve wall by a piston seal.

Moreover, the closing element can be arranged in the valve chamber and be connected to the piston by a tappet, wherein the tappet is passed through an aperture in the partition wall, and wherein the tappet is sealed off with respect to the aperture by a seal. As an alternative, the piston, the closing element and the tappet can be embodied as a one-piece movable valve closing body. If leakage from the valve chamber to the first control chamber occurs in the closed position via the closing element, which forms a seal in a corresponding valve seat, and the compensating connection, the sealing effect in the valve seat increases owing to the leakage-induced increase in the pressure in the first control chamber and hence to the action of a closing force on the first piston surface of the valve closing body. In the case of leakage between the second control chamber and the first control chamber via the piston seal or between the second control chamber and the valve chamber via the seal against the partition wall in the partially or fully active system mode, the return pump can draw in the leakage volumes via the suction side and discharge with a pressure buildup effect, via the discharge side, into the second control chamber and, at the same time, to the braking element at the wheel via a check valve and an inlet valve as a braking pressure. Thus, the possible internal system leakages which have been described in the pressure switching valve according to the disclosure do not hinder any function in the vehicle brake system according to the disclosure as long as the pressure differences required for the open position of the pressure switching valve according to the disclosure, between the suction side or the first control chamber and the discharge side or the second control chamber, are maintained.

In an advantageous embodiment of the pressure switching valve according to the disclosure, the compensating connection can be designed as an external compensating duct which connects a compensating opening of the first control chamber to the outlet opening. The compensating duct can, for example, be formed in a fluid block in which the pressure switching valve according to the disclosure is arranged. As an alternative, the compensating connection can also be designed as a compensating bore in the valve closing body, connecting the outlet opening to the first control chamber in the closed position of the valve closing body and connecting the valve chamber to the first control chamber in the open position of the valve closing body. This advantageously enables the routing of the fluid duct in the fluid block to be simplified.

In another advantageous embodiment of the pressure switching valve according to the disclosure, the setting spring can be arranged in the second control chamber and be supported on the partition wall and on the second piston surface, with the result that, in the unpressurized state, the valve closing body is arranged in the open position and the fluid connection between the inlet opening and the outlet opening is open. In this valve position, the fluid connection between the brake master cylinder and the pump suction side or the inlet of the return pump is open. In the case of a passive braking operation, i.e. where a driver brakes and the return pump is off, the pressure in the first control chamber rises via the inlet opening, which is connected to the brake master cylinder, and via the outlet opening, which is connected to the pump suction side or the compensating connection. The force engendered by the pressure has a closing effect on the first piston surface of the valve closing body in the first control chamber. If the pressure force engendered exceeds the spring force of the setting spring, the closing element is pressed into the valve seat, with the result that the pressure switching valve closes. As a result, the fluid path from the brake master cylinder to the suction side of the return pump is interrupted and the return pump and the pump seals are protected in this closed valve position.

In another advantageous embodiment of the pressure switching valve according to the disclosure, the setting spring can be arranged in the first control chamber and can be supported on a valve top and the first piston surface, with the result that, in the unpressurized state, the valve closing body is arranged in the closed position and the fluid connection between the inlet opening and the outlet opening is interrupted. In this valve position, the closing element is pressed into the valve seat and the pressure switching valve is closed, with the result that the fluid connection between the brake master cylinder and the pump suction side or the inlet of the return pump is interrupted. During a passive braking operation, therefore, the pump and the pump seals are protected by the pressure switching valve. To open the pressure switching valve, the pressure force produced on the basis of the pressure difference between the first and second control chambers must exceed the spring force of the setting spring, causing the valve closing body to move and the closing element to be raised from the valve seat in order to establish the fluid connection between the inlet opening and the outlet opening.

Irrespective of the arrangement of the setting spring in the valve interior, the brake pressure in the closed position of the pressure switching valve is built up in the braking element at the wheel via the changeover valve and the inlet valve. In this case, the check valve arranged after the return pump is closed by the pressure difference. In the closed valve position of the pressure switching valve according to the disclosure, there is no pressure buildup or no pressure reduction in the second control chamber of the pressure switching valve according to the disclosure. Since the pressure switching valve is closed, there is also no change in pressure in the first control chamber of the pressure switching valve. The valve chamber is designed to be pressure-compensated, with the result that the pressure produced by the brake master cylinder does not induce any resulting opening or closing forces on the closing element in the valve chamber. Thus, the pressure switching valve remains closed as long as the driver is braking.

In the case of a partially active system mode, i.e. where the driver is braking and the pump is activated for the purpose of boosting the braking effect or for a parallel control intervention, or of a fully active system mode, i.e. where the vehicle brake system is performing a braking operation or a control operation, e.g. an ABS or ESP intervention, automatically without the participation of the driver, and the brake pressure at the wheel is built up only by means of the return pump, the return pump starts up and builds up the system pressure. During this process, the pressure in the second control chamber rises and has an opening effect on the second piston surface owing to the forces produced. At the same time, the return pump sucks the fluid volume out of the first control chamber and, by means of the vacuum which forms and the resulting additional opening forces in the first control chamber, supports the opening process or the open position of the pressure switching valve.

In an advantageous embodiment of the vehicle brake system according to the disclosure, the inlet opening of the pressure switching valve can be connected to the brake master cylinder and the outlet opening of the pressure switching valve can be connected to the inlet or the suction side of the return pump. Moreover, the control port of the pressure switching valve can be connected to the outlet or the discharge side of the return pump.

Embodiments of the disclosure are shown in the drawings and are explained in greater detail in the following description. In the drawings, the same reference signs denote components or elements which perform the same or similar functions.

DETAILED DESCRIPTION

Figure 1:
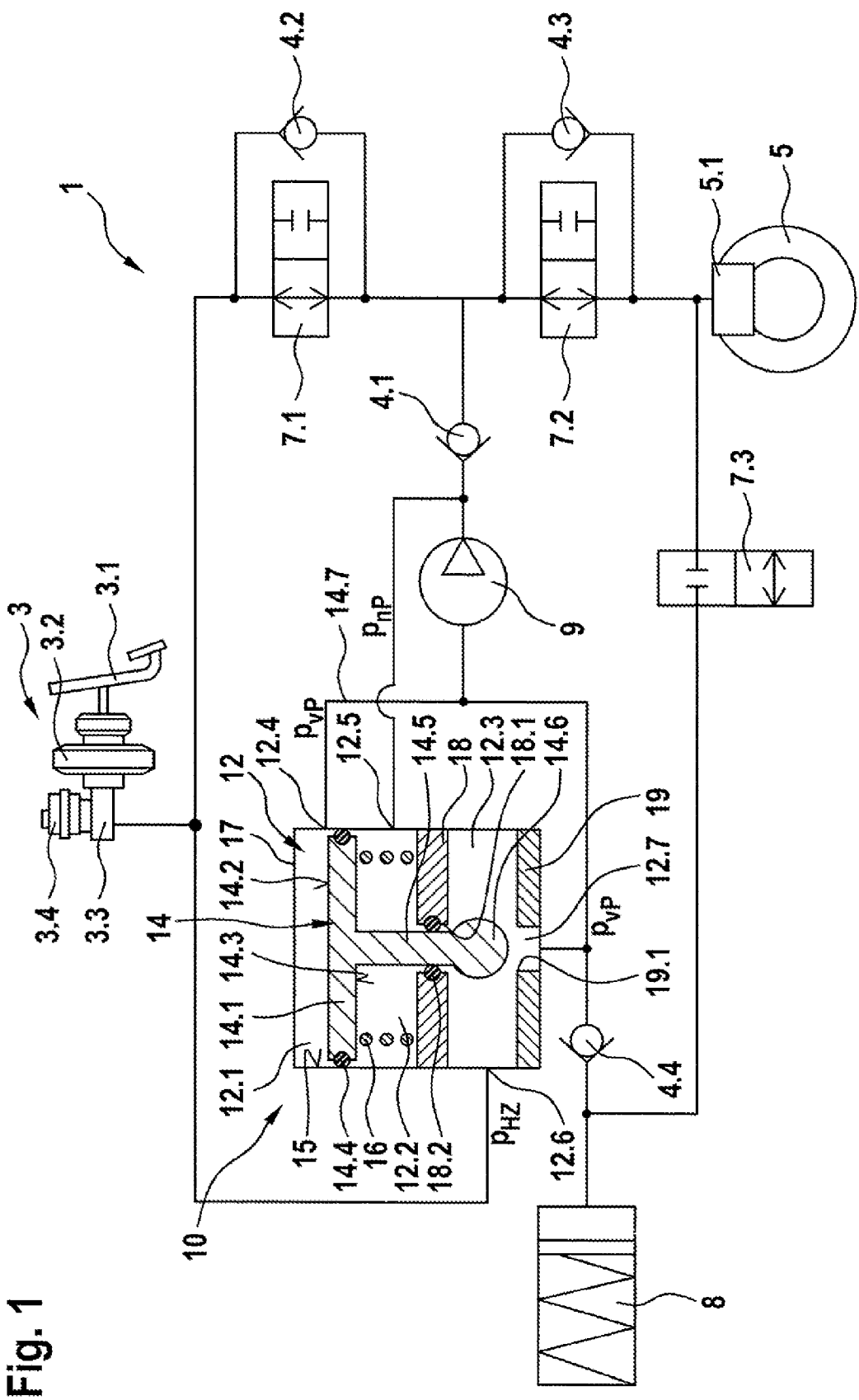
FIG. 1 shows a schematic representation of a section of a vehicle brake system having a first embodiment of a pressure switching valve according to the disclosure.

As can be seen from FIGS. 1 to 4, the illustrated embodiments of a vehicle brake system 1, 1', 2, 2' according to the disclosure each comprise a brake unit 3 having a brake pedal 3.1, a brake booster 3.2, a brake master cylinder 3.3 and a reservoir 3.4, a fluid control unit having at least two brake circuits, of which one is shown at least in part, and at least one wheel brake 5.1 at each wheel 5. For brake pressure modulation of the at least one wheel brake 5.1 in the corresponding brake circuit, the fluid control unit in each case has a changeover valve 4.1, a pressure switching valve 10, 10', 11, 11', an inlet valve 7.2, an outlet valve 7.3 and a return pump 9 having an accumulator chamber 8, which can also be used for another wheel brake 5.1 at another wheel 5. Moreover, the fluid control unit comprises a plurality of check valves 4.1, 4.2, 4.3, 4.4. The fluidically controlled pressure switching valve 10, 10', 11, 11' is in each case fitted in in a suction line between the corresponding return pump 9 and the brake master cylinder 3.3.

As can furthermore be seen from FIGS. 1 to 4, the illustrated embodiments of the fluidically controlled pressure switching valve 10, 10', 11, 11' according to the disclosure each comprise a valve chamber 12.3, which is arranged in a valve interior 12 and into which an inlet opening 12.6 and an outlet opening 12.7 open, and a valve closing body 14, 14', which is guided movably in the valve interior 12 and which comprises a piston 14.1, 14.1', having a first piston surface 14.2, 14.2' and a second piston surface 14.3, 14.3', and a closing element 14.6, 14.6'. The valve closing body 14, 14' can be moved in accordance with a pressure difference between a pressure acting on the first piston surface 14.2, 14.2' and a pressure acting on the second piston surface 14.3, 14.3', against the force of a setting spring 16, 16' arranged in the valve interior 12, between a closed position, in which a fluid connection between the inlet opening 12.6 and the outlet opening 12.7 is interrupted, and an open position, in which the fluid connection between the inlet opening 12.6 and the outlet opening 12.7 is open. In this case, the first piston surface 14.2, 14.2' delimits a first control chamber 12.1 in the valve interior 12, which chamber is connected by at least one compensating connection 14.7, 14.7' to the outlet opening 12.7, and the second piston surface 14.3, 14.3' delimits a second control chamber 12.2, wherein the second control chamber 12.2 is separated from the valve chamber 12.3 by a partition wall 18. According to the disclosure, the second control chamber 12.2 is connected to a system pressure $p_{nP}$ by a control port 12.5, 12.5'.

As can furthermore be seen from FIGS. 1 to 4, the inlet opening 12.6 of the pressure switching valve 10, 10', 11, 11' is connected to the brake master cylinder 3.3 and the outlet opening 12.7 of the pressure switching valve 10, 10', 11, 11' is connected to an inlet for a suction side of the return pump 9. The control port 12.5, 12.5' of the pressure switching valve 10, 10', 11, 11' is connected to an outlet or a discharge side of the return pump 9. As can furthermore be seen from FIGS. 1 to 4, the piston 14.1, 14.1' separates the first control chamber 12.1 from the second control chamber 12.2 and is sealed off with respect to a valve wall 15 by a piston seal 14.4. Moreover, the closing element 14.6, 14.6' is arranged in the valve chamber 12.3 and is connected to the piston 14.1, 14.1' by a tappet 14.5, 14.5', wherein the tappet 14.5, 14.5' is passed through an aperture 18.1 in the partition wall 18 and is sealed off with respect to the aperture 18.1 by a seal 18.2.

Figure 2:
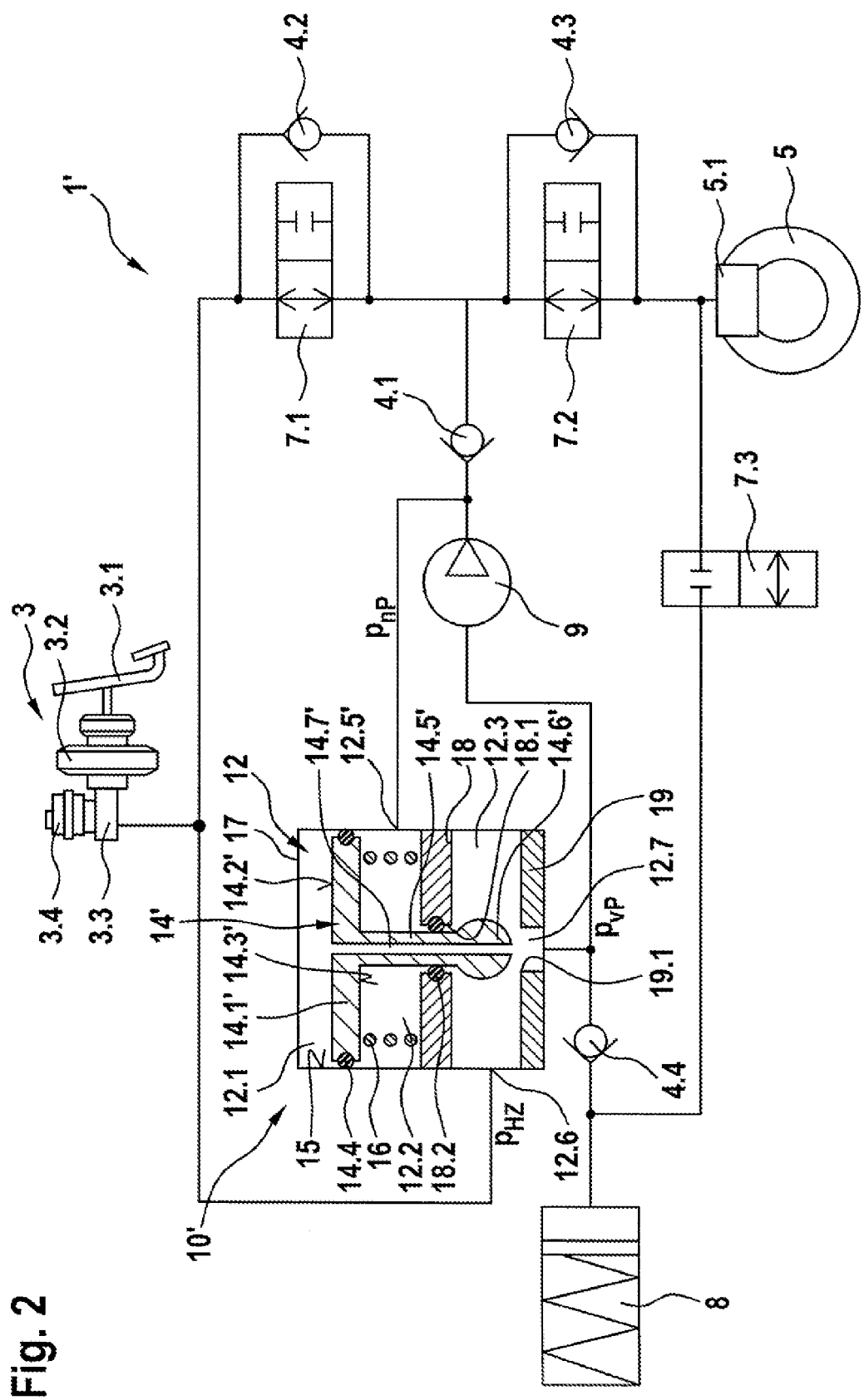
FIG. 2 shows a schematic representation of a section of a vehicle brake systems having a second embodiment of a pressure switching valve according to the disclosure.

As can furthermore be seen from FIGS. 1 and 2, the first and second embodiments of the pressure switching valve 10, 10' according to the disclosure are embodied as a valve which is open in the unpressurized state. This means that, in the unpressurized state of the pressure switching valve 10, 10', there is a fluid connection between the inlet opening 12.6 and the outlet opening 12.7 of the pressure switching valve 10, 10'. The setting spring 16 is therefore arranged in the second control chamber 12.2 and is supported on the partition wall 18 and on the second piston surface 14.3, 14.3', with the result that, in the unpressurized state, the valve closing body 14, 14' is arranged in the open position and the fluid connection between the inlet opening 12.6 and the outlet opening 12.7 is open.

As can furthermore be seen from FIG. 1, the compensating connection in the first embodiment of the pressure switching valve 10 according to the disclosure is designed as an external compensating duct 14.7 which connects a compensating opening 12.4 of the first control chamber 12.1 to the outlet opening 12.7.

As can furthermore be seen from FIG. 2, the compensating connection in the second embodiment of the pressure switching valve 10' according to the disclosure, in contrast to the first embodiment, is designed as a compensating bore 14.7' in the valve closing body 14', which connects the outlet opening 12.7 to the first control chamber 12.1 in the closed position of the valve closing body 14' and connects the valve chamber 12.3 to the first control chamber 12.1 in the illustrated open position of the valve closing body 14'.

The operation of the first and second embodiments of the pressure switching valve 10, 10' according to the disclosure will be described below with reference to FIGS. 1 and 2. The embodiments of the vehicle brake system 1, 1' according to the disclosure which are shown in FIGS. 1 and 2 each comprise a pressure switching valve 10, 10' which is open in the unpressurized state and which is operated by a system pressure $p_{nP}$ applied to the control port 12.5, 12.5' and produced at the outlet or the discharge side by the return pump 9.

In a passive system mode, in which the return pump 9 is switched off or deactivated, the setting spring 16 in the second control chamber 12.2 of the pressure switching valve 10, 10' acts on the second piston surface 14.3, 14.3' of the movable valve closing body 14, 14'. As a result, the valve closing body 14, 14' is in the open position and the closing element 14.6, 14.6' is raised from the valve seat 19.1, which is arranged in a valve base 19, with the result that, in this valve position, the hydraulic connection between the brake master cylinder 3.3 and the inlet or suction side of the return pump 9 is established. During a passive braking operation, i.e. where the driver is braking and the return pump 9 is off, the pressure in the first control chamber 12.1 rises owing to the pressure $p_{Hz}$ of the brake master cylinder 3.3, which is applied to the inlet opening 12.6 and acts via the valve chamber 12.3, the outlet opening 12.7 and the compensating connection 12.7, 12.7' on the first control chamber 12.1. The force engendered by the pressure has a closing effect on the first piston surface 14.2, 14.2' of the movable valve closing body 14, 14' in the first control chamber 12.1. If the pressure force engendered at the first piston surface 14.2, 14.2' overcomes the spring force of the setting spring 16, which is embodied as a spiral spring for example, and a possible frictional force of the seals 14.4, 18.2, the pressure switching valve 10, 10' closes and the valve closing body 14, 14' is moved in the closing direction until the closing element 14.6, 14.6' is pressed into the valve seat 19.1 and the fluid connection between the brake master cylinder 3.3 and the suction side or inlet of the return pump 9 is interrupted. In this closed position of the pressure switching valve 10, 10', the return pump 9 and the pump seals of the pump suction side are protected since the pressure $p_{vP}$ at the inlet or at the suction side of the return pump 9 does not rise above a critical value. The brake pressure is built up in the wheel brakes 5.1 at the wheel 5 via the changeover valve 7.1 and the inlet valve 7.2. In this case, a first check valve 4.1 is closed by the pressure difference. In the closed position of the pressure switching valve 10, 10', there is no pressure buildup or no pressure reduction in the second control chamber 12.2. Since the pressure switching valve 10, 10' is closed, there is also no change in pressure in the first control chamber 12.1. The valve chamber 12.3 is designed to be pressure-compensated, with the result that the pressure $p_{Hz}$ produced by the brake master cylinder 3.3 does not induce any resulting opening or closing forces on the closing element 14.6, 14.6' in the valve chamber 12.3. The pressure switching valve 10, 10' remains closed as long as the driver is braking.

In the case of a partially active or a fully active mode, the return pump 9 starts up and builds up the system pressure $p_{nP}$. As a result, the pressure in the second control chamber 12.2 rises and has an opening effect on the second piston surface 14.3, 14.3' of the movable valve closing body 14, 14'. At the same time, the return pump 9 sucks the fluid volume out of the first control chamber 12.1 and, by means of the vacuum which forms in the first control chamber 12.1 and the resulting additional opening forces, supports the open position of the pressure switching valve 10, 10'. The open position of the pressure switching valve 10, 10' is ensured by the system pressure $p_{nP}$ produced by the return pump 9. As a result, the fluid connection between the brake master cylinder or the reservoir 3.4 of the brake unit 3 and the pump suction side or the inlet of the return pump 9 is maintained and the return pump 9 can draw in fluid freely from the reservoir 3.4 and builds up the required brake pressure in the respective wheel brake 5.1 at a wheel 5 via the inlet valve 7.2. As long as the return pump 9 is running, the pressure switching valve 10, 10' remains reliably in the open position owing to the pressure $p_{nP}$ on the discharge side of the return pump 9 or in the second control chamber 12.2 and to the vacuum $p_{vP}$ on the suction side of the pump or in the first control chamber 12.1. When the return pump 9 is deactivated, the system pressure $p_{nP}$ falls and the valve closing body 14, 14' of the pressure switching valve 10, 10' remains in the open position only by reason of the opening spring forces of the setting spring 16 in the second control chamber 12.2.

Figure 3:
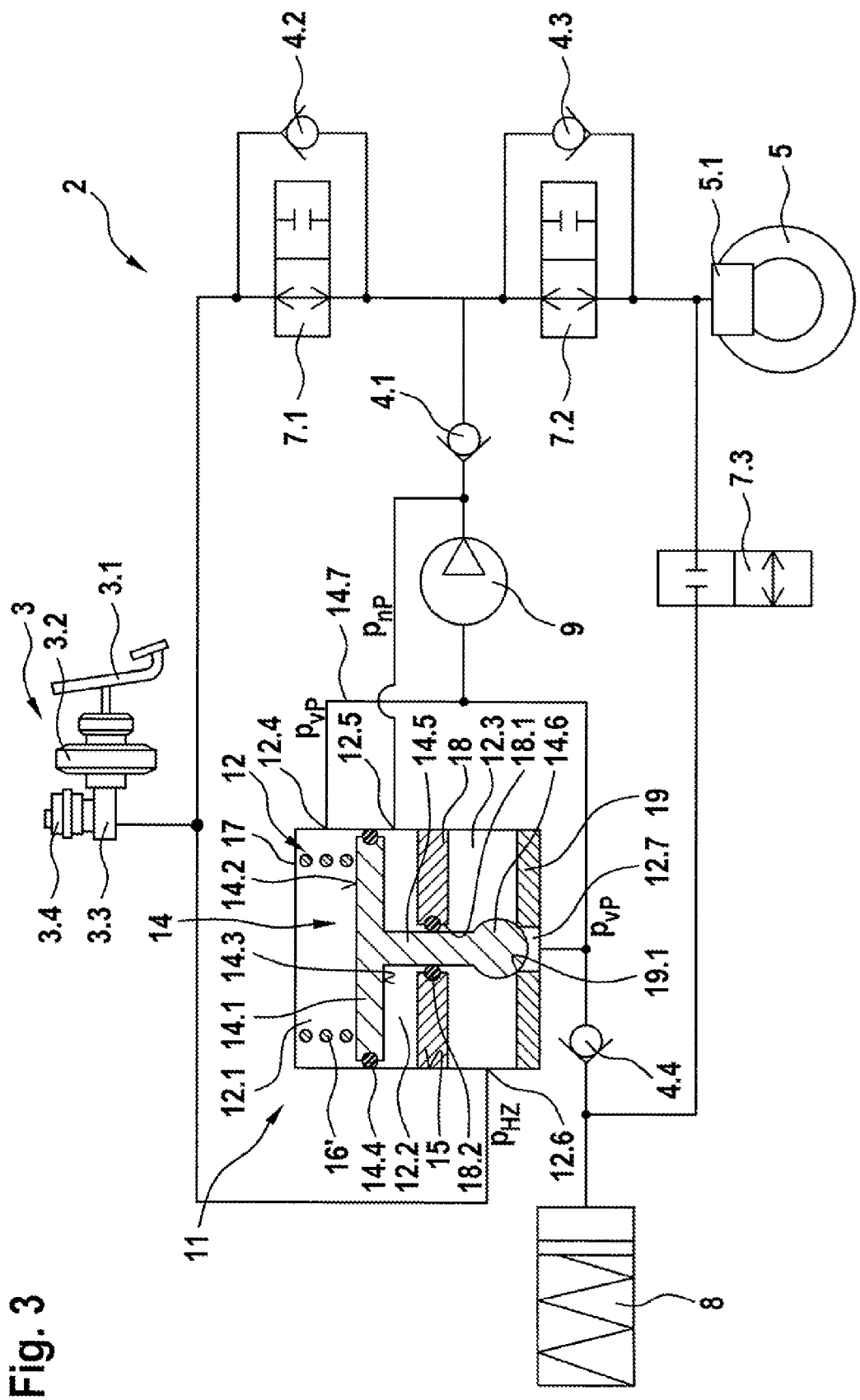
FIG. 3 shows a schematic representation of a section of a vehicle brake system having a third embodiment of a pressure switching valve according to the disclosure.
Figure 4:
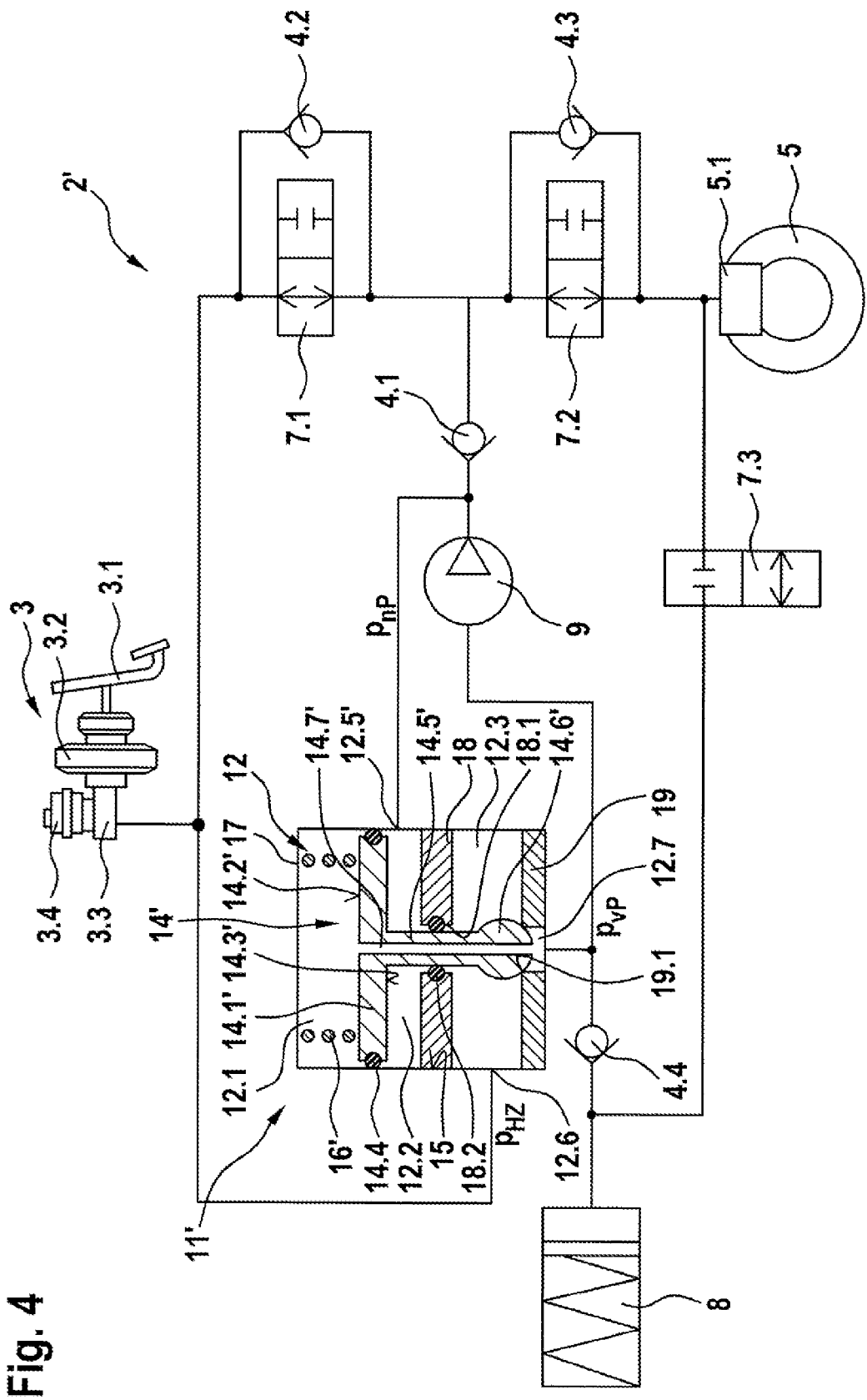
FIG. 4 shows a schematic representation of a section of a vehicle brake system having a fourth embodiment of a pressure switching valve according to the disclosure.

As can furthermore be seen from FIGS. 3 and 4, the third and fourth embodiments of the pressure switching valve 11, 11' according to the disclosure are embodied as a valve which is closed in the unpressurized state. This means that, in the unpressurized state of the pressure switching valve 11, 11', a fluid connection between the inlet opening 12.6 and the outlet opening 12.7 of the pressure switching valve 11, 11' is interrupted. The setting spring 16 is therefore arranged in the first control chamber 12.1 and is supported on a valve top 17 and the first piston surface 14.2, 14.2', with the result that, in the unpressurized state, the valve closing body 14, 14' is arranged in the closed position and the fluid connection between the inlet opening 12.6 and the outlet opening 12.7 is interrupted.

As can furthermore be seen from FIG. 3, the compensating connection in the third embodiment of the pressure switching valve 11 according to the disclosure, like the first embodiment of the pressure switching valve 11 according to the disclosure, is designed as an external compensating duct 14.7, which connects a compensating opening 12.4 of the first control chamber 12.1 to the outlet opening 12.7.

As can furthermore be seen from FIG. 4, the compensating connection in the fourth embodiment of the pressure switching valve 11' according to the disclosure, like the second embodiment of the pressure switching valve 10' according to the disclosure is, in contrast to the third embodiment, designed as a compensating bore 14.7' in the valve closing body 14', which connects the outlet opening 12.7 to the first control chamber 12.1 in the closed position of the valve closing body 14' and connects the valve chamber 12.3 to the first control chamber 12.1 in the illustrated open position of the valve closing body 14'.

The operation of the third and fourth embodiments of the pressure switching valve 11, 11' according to the disclosure will be described below with reference to FIGS. 3 and 4. The embodiments of the vehicle brake system 2, 2' according to the disclosure which are shown in FIGS. 3 and 4 each comprise a pressure switching valve 11, 11' which is closed in the unpressurized state and which is operated by a system pressure $p_{nP}$ applied to the control port 12.5, 12.5' and produced at the outlet or the discharge side by the return pump 9.

In a passive system mode, in which the return pump 9 is switched off or deactivated, the setting spring 16' in the first control chamber 12.1 of the pressure switching valve 11, 11' acts on the first piston surface 14.2, 14.2' of the movable valve closing body 14, 14'. As a result, the valve closing body 14, 14' is in the closed position and the closing element 14.6, 14.6' is pressed into the valve seat 19.1, with the result that, in this valve position, the hydraulic connection between the brake master cylinder 3.3 and the inlet or suction side of the return pump 9 is interrupted. During a passive braking operation, i.e. where the driver is braking and the return pump 9 is off, the return pump 9 and the pump seals are protected from excessive pressures on the suction side or at the inlet by the pressure switching valve 11, 11' in the closed position. The brake pressure is built up in the wheel brake 5.1 at the wheel 5 via the changeover valve 7.1 and the inlet valve 7.2. In this case, the first check valve 4.1 is closed by the pressure difference. In the closed position of the pressure switching valve 11, 11', there is no pressure buildup or no pressure reduction in the second control chamber 12.2. Since the pressure switching valve 11, 11' is closed, there is also no change in pressure in the first control chamber 12.1. The valve chamber 12.3 is designed to be pressure-compensated, with the result that the pressure $p_{Hz}$ produced by the brake master cylinder 3.3 does not induce any resulting opening or closing forces on the closing element 14.6, 14.6' in the valve chamber 12.3.

In the case of a partially active or a fully active mode, the return pump 9 starts up and builds up the system pressure $p_{nP}$. As a result, the pressure in the second control chamber 12.2 rises and has an opening effect on the second piston surface 14.3, 14.3' of the movable valve closing body 14, 14'. At the same time, the return pump 9 sucks the fluid volume out of the first control chamber 12.1 and, by means of the vacuum which forms in the first control chamber 12.1 and the resulting additional opening forces, supports the opening movement or the open position of the valve closing body 14, 14'. As soon as the opening forces overcome the spring forces of the setting spring 16' and a possible frictional force of the seals 14.4, 18.2, the valve closing body 14, 14' moves in the opening direction and the closing element 14.6, 14.6' is raised from the valve seat 19.1. By means of the system pressure $p_{nP}$ produced by the return pump 9, the open position of the pressure switching valve 11, 11' is achieved and ensured, thus establishing and maintaining the fluid connection between the brake master cylinder or the reservoir 3.4 of the brake unit 3 and the pump suction side or the inlet of the return pump 9. As a result, the return pump 9 can draw in fluid freely from the reservoir 3.4 and build up the required brake pressure in the respective wheel brake 5.1 of a wheel 5 via the inlet valve 7.2. As long as the return pump 9 is running, the pressure switching valve 10, 10' remains reliably in the open position owing to the pressure $p_{nP}$ on the discharge side of the return pump 9 or in the second control chamber 12.2 and to the vacuum $p_{vP}$ on the suction side of the pump or in the first control chamber 12.1. When the return pump 9 is deactivated, the system pressure $p_{nP}$ falls and the valve closing body 14, 14' of the pressure switching valve 11, 11' moves into the closed position by reason of the closing spring forces of the setting spring 16' in the first control chamber 12.1, in which the closing element 14.6, 14.6' is pressed sealingly into the valve seat 19.1.

Various suitable pumps or pump elements known to a person skilled in the art, of various types and forms, e.g. piston pumps, gear pumps etc., can be used as the return pump 9. The pressure switching valve 10, 10', 11, 11' according to the disclosure can be embodied either as a single-stage or as a two- or multi-stage pressure switching valve. The design configuration of the pressure switching valve is given here only by way of example. Various suitable seals known to a person skilled in the art, of a very wide variety of forms and embodiments, e.g. rubber seals, Teflon seals, diaphragms, cup seals etc., can be used as the piston seal 14.4 or seal 18.2 between the partition wall 18 and the tappet 14.5, 14.5'.

What is claimed is:

1. A fluidically controlled pressure switching valve for a vehicle brake system comprising:
    a valve chamber located in a valve interior and including an inlet opening and an outlet opening that opens into the valve chamber;
    a setting spring located in the valve interior; and
    a valve closing body configured to be guided movably in the valve interior and including (i) a piston defining a first piston surface and a second piston surface, and (ii) a closing element,
    wherein the valve closing body is configured to be moved against a force of the setting spring between a closed position and an open position in accordance with a pressure difference between a first pressure acting on the first piston surface and a second pressure acting on the second piston surface,
    wherein in the closed position a fluid connection between the inlet opening and the outlet opening is interrupted and in the open position the fluid connection between the inlet opening and the outlet opening is open,
    wherein the first piston surface delimits a first control chamber in the valve interior, and the first control chamber is connected by at least one compensating connection to the outlet opening,
    wherein the second piston surface delimits a second control chamber, and the second control chamber is separated from the valve chamber by a partition wall, and
    wherein the second control chamber is configured to be fluidly connected to a pump outlet of a return pump by a control port.

2. The pressure switching valve according to claim 1, wherein the piston separates the first control chamber from the second control chamber and is sealed off with respect to a valve wall by a piston seal.

3. The pressure switching valve according to claim 1, wherein:
    the closing element is located in the valve chamber and is connected to the piston by a tappet,
    the tappet passes through an aperture in the partition wall, and
    the tappet is sealed off with respect to the aperture by a seal.

4. The pressure switching valve according to claim 1, wherein the at least one compensating connection is configured as an external compensating duct that connects a compensating opening of the first control chamber to the outlet opening.

5. The pressure switching valve according to claim 1, wherein the at least one compensating connection defines a compensating bore in the valve closing body configured (i) to connect the outlet opening to the first control chamber in the closed position of the valve closing body, and (ii) to connect the valve chamber to the first control chamber in the open position of the valve closing body.

6. The pressure switching valve according to claim 1, wherein the setting spring is located in the second control chamber and is supported on the partition wall and on the second piston surface such that, in an unpressurized state, the valve closing body is urged by the spring into the open position and the fluid connection between the inlet opening and the outlet opening is open.

7. The pressure switching valve according to claim 1, wherein the setting spring is located in the first control chamber and is supported on a valve top and the first piston surface such that, in an unpressurized state, the valve closing body is urged by the spring into the closed position and the fluid connection between the inlet opening and the outlet opening is interrupted.

8. A vehicle brake system comprising:
    a brake master cylinder;
    at least one wheel brake; and
    a fluid control unit including a change over valve, a pressure switching valve, and a return pump, the fluid control unit being configured to modulate brake pressure of the at least one wheel brake in at least one brake circuit, and the pressure switching valve being fitted in a suction line between the return pump and the brake master cylinder,
    wherein the pressure switching valve is a fluidically controlled pressure switching valve,
    wherein the pressure switching valve includes:
        a valve chamber located in a valve interior and including an inlet opening and an outlet opening into the valve chamber;
        a setting spring located in the valve interior; and
        a valve closing body configured to be guided movably in the valve interior and including (i) a piston defining a first piston surface and a second piston surface, and (ii) a closing element,
    wherein the valve closing body is configured to be moved against a force of the setting spring between a closed position and an open position in accordance with a pressure difference between a first pressure acting on the first piston surface and a second pressure acting on the second piston surface, wherein in the closed position a fluid connection between the inlet opening and the outlet opening is interrupted and in the open position the fluid connection between the inlet opening and the outlet opening is open, wherein the first piston surface delimits a first control chamber in the valve interior and the first control chamber is connected by at least one compensating connection to the outlet opening, wherein the second piston surface delimits a second control chamber and the second control chamber is separated from the valve chamber by a partition wall, and wherein the second control chamber is fluidly connected to a pump outlet of the return pump by a control port.

9. The vehicle brake system according to claim 8, wherein the inlet opening of the pressure switching valve is fluidly connected to the brake master cylinder and the outlet opening of the pressure switching valve is fluidly connected to a pump inlet of the return pump.

* * * * *